United States Patent [19]

van't Hullenaar, deceased

[11] 4,316,269
[45] Feb. 16, 1982

[54] OWN DOPPLER NULLIFIER FOR SONAR SYSTEM

[75] Inventor: Adrian van't Hullenaar, deceased, late of Smithville, Canada, by A. van't Hullenaar, executrix

[73] Assignee: Westinghouse Canada Limited, Hamilton, Canada

[21] Appl. No.: 196,306

[22] Filed: Oct. 14, 1980

Related U.S. Application Data

[62] Division of Ser. No. 70,686, Aug. 29, 1979, Pat. No. 4,274,148.

[30] Foreign Application Priority Data

Sep. 8, 1978 [CA] Canada .................................. 310882

[51] Int. Cl.$^3$ ............................................ G01S 15/58
[52] U.S. Cl. ...................................... 367/90; 367/904
[58] Field of Search ................................. 367/90, 904

[56] References Cited
FOREIGN PATENT DOCUMENTS 1394985 5/1975 United Kingdom ................ 367/904

Primary Examiner—Richard A. Farley
Attorney, Agent, or Firm—Robert H. Fox; Edward H. Oldham

[57] ABSTRACT

There is described a digital sonar receiver having a novel beamformer, own doppler nullifier (O.D.N.), and adaptive time varied gain controller. The beamformer interrogates a multi-element transducer by utilizing an interleaved sampling scheme which samples the elements in the transducers array sequentially, in such a fashion that continuous, uniformly spaced samples are obtained. The samples are subsequently converted into digital format, weighed and summed. The O.D.N. eliminates the own ship's doppler effect on the beam output signal resulting in a half beam output signal representative of the target doppler. The O.D.N. offsets the frequency of the beam output signal and a digital generated signal representative of the own ship's doppler. The O.D.N. multiplies these two offsetted signals resulting in a signal lying in each of the sum and difference frequency bands for which the signal lying in the difference frequency band corresponds to the target doppler. The adaptive time varied gain controller varies the gain of preamplifiers at the input of the sonar receiver to be inversely proportional to the momentary average reverberation level of the medium in which the receiver operates. The adaptive time varied gain control apparatus initially sets the gain of the preamplifiers to be inversely proportional to a standard reverberation curve during the first ping-cycle and subsequently updates the gain of the preamplifiers during each successive ping-cycle by computing a gain correction from the average value of a predetermined number of beam output signals.

6 Claims, 10 Drawing Figures

OWN DOPPLER NULLIFIER FOR SONAR SYSTEM

This application is a division of application Ser. No. 070,686, filed June 29, 1979, now U.S. Pat. No. 4,274,148.

This invention relates to a digital sonar receiver comprising a digital beamformer, a digital adaptive time varied gain controller, and a digital own doppler nullifier (O.D.N.). The sonar receiver receives sonar signals in analogue form and converts the sonar signals into digital form in the beamformer when forming beam output signals. The remainder of the sonar receiver which includes the O.D.N. and adaptive time varied gain controller operates digitally.

In the past, sonar receivers for the most part have processed sonar signals in analogue format. However, more recent sonar receivers have been directed towards processing the signals in digital format.

Previous digital beamformer designs have been directed towards a method of forming simultaneous beams. To form simultaneous beams a cylindrical array of staves had been simultaneously sampled at some initial time. The staves are then sampled simultaneously at later moments in time corresponding to the delay times introduced by the geometry of the array. This method of simultaneous beamforming when implemented, requires for each stave a sample and hold circuit and an A/D converter. This method of beamforming has resulted in rather uneconomical use of time as well as hardware.

The received sonar signals prior to beamforming comprise ambient noise and noise from any undesirable targets. The received sonar signal besides including an echo from the desired target also includes noise due to reverberation. Reverberation is a function of the range or time taken for a transmitted signal to hit a target and return. Reverberation decreases as range or time increases. Eventually the noise due to reverberation decreases below the ambient noise in the medium of operation which then becomes the dominant noise.

To eliminate the effect of noise due to reverberation the gain of the preamplifiers in a sonar receiver is adjusted to be inversely proportional to an assumed "standard" reverberation curve. The adjustment of the gain of the preamplifiers with respect to the "standard" reverberation curve has not been too effective in reducing the noise due to the actual reverberation. Large discrepencies between the "standard" reverberation curve and actual reverberation easily result from surface reflections, back scattering, and marine life.

Subsequent to beamforming, beam output signals that contain information corresponding to the target are often shifted in frequency. This frequency shift is known as the total doppler shift which, for the most part, is due to the doppler shift produced by target movement and the doppler shift produced by the source of transmission's movement or the own ship's doppler. It is necessary to eliminate the doppler effect of the own ship from the beam output signal so that the target information may be analyzed. Analogue sonar receivers eliminate the own ship's doppler by mixing the beam output signal with a generated signal corresponding to the own ship's doppler. The signal corresponding the own ship's doppler may be calculated from the velocity of sound in water, the ship's speed and heading which are all known. The result of this mixing process yields a sum signal and a difference signal where the difference signal is representative of the target information only. However, when the beam output signals are in digital form the effects of noise folding over from the negative frequency band may introduce error in the digital difference signal. Moreover the sum digital signal may overlap or lie too close to the difference digital signal thereby preventing the economical use of filters to filter out the sum signal.

The present invention relates to a digital sonar receiver having a novel beamformer for digitally beamforming output signals from received sonar signals, a novel own doppler nullifier, and an apparatus for varying the gain of sonar preamplifiers to be inversely proportional to the momentary average reverberation level of the medium in which the sonar receiver operates.

In accordance with one aspect of this invention there is provided a beamformer for forming a plurality of digital beam output signals in a sonar receiver which has a multi-element symmetrical transducer array. Each beam output signal has a direction which is related to at least one respective directional element in the transducer array. The total number of samples to be taken is given as the product of the total number of beams M to be formed and the number sample-sets n desired to form any beam. Due to the symmetry of the array a sample-set may consist of two samples taken from each element symmetrically disposed on opposite sides of the at least one directional element. The beamformer sequentially samples the elements, in such a fashion that continuous, uniformly spaced samples are obtained. To obtain uniformly spaced samples the method of beamforming and beamformer apparatus sample each i element symmetrically disposed to the left and right of the directional element for each beam m during each consecutive sampling interval, z, where i is defined as an integer value greater than or equal to 0 and less than or equal to $n-1$. The sampling interval z is defined as an integer $0 \leq z \leq Z$. The beamformer determines from the sampling interval which elements symmetrically disposed to the left and right of the directional element are to be sampled. The directional element which is utilized to form the beam m may be given by:

$$m = \text{Remainder}\left[\frac{\frac{z-di}{n}+M}{M}\right]+1$$

where di is a time delay of the $i^{th}$ sample to the right and left of beam m with respect to its first sample. For any given sampling interval beam m may be determined if the time delay is a function of the sampling interval. The time delay is an approximation of the exact time delay for the movement of a sonar signal through the medium of operation to impinge on the elements of the sample-set after the sonar signal has impinged on the at least one respective directional element for the beam. It should be understood that for this method the time delay is expressed as an integer number of sampling intervals where di is chosen to be the integer number of sampling intervals closest to the exact time delay such that, the remainder of the delay when divided by the total number of sample-sets to be taken has a different integer value for each value of i. The value of i may be determined from the remainder [di/n] which is equal to the remainder [z/n]. During each sampling interval the beamformer sums together the samples taken from each i element to the right and left of beam m, so as to form a sample-set. The beamformer converts the sample-set from analogue format to digital format. The beamformer multiplies the digital sample-set with weights. The beamformer adds each digital sample-set to its corresponding partial sum of sample-sets and stores this partial sum. The output of the partial sum for each beam when all n samples of the sample-set beam m have been summed is the beam output signal corresponding to beam m.

It should be understood that the sampling of the beams sequentially, in such a fashion that continuous, uniformly spaced samples are obtained may be determined for any multi-elements symmetrical array and may be stored as a timing schedule in a memory device. It should therefore become apparent that a beamformer using this sampling method only requires one A/D converter. It should also be apparent that the sampling method results in an economical use of equipment and time.

In accordance with another aspect of this invention there is provided an adaptive time varying gain control apparatus for varying the gain of the preamplifiers of the sonar receiver during each consecutive ping-cycle to be inversely proportional to the momentary average reverberation in the medium of operation. The apparatus comprises a storage means which has a plurality of storage spaces for storing a stored gain. A preset means is provided for initially storing in these storage spaces gain step approximations of an inverse standard reverberation curve where each of the gain step approximations has a respective time duration which is determined from the standard reverberation curve. Also included in the apparatus is a means for storing each time duration and for associating each of the time durations with the storage space where the time durations respective gain step approximation has been initially stored. A control means is provided for varying the gain of the preamplifiers to correspond to each stored gain during each ping-cycle whereby each stored gain is applied to the preamplifiers for a duration which is equal to the time duration associated with the stored gains respective storage space. An averaging means is also provided in the apparatus for averaging a plurality of beam output signals from a beamformer in the sonar receiver during each time duration. The apparatus includes a means for determining a gain correction as a function of a reference signal and the average of the beam output signals during each time duration. The apparatus further includes means for computing a new gain by summing the gain correction during each time duration with the respective stored gain associated with that time duration. Lastly, a means for storing a new gain in the stored gains respective storage space during each time duration is provided.

It should be understood that the gain step approximations may be uniform step approximations. Also the means for determining a gain correction may be a means for computing a logarithmic function of the average of the beam output signal when divided by the reference signal. The determining means may also include a comparing means which compares the average of the beam output signals with the reference signal to give a coded value of the gain correction. This coded value may be used to access a memory which has precalculated values for the gain correction stored therein.

The adaptive time varying gain control apparatus continually updates the gain of the preamplifiers during each ping-cycle by correcting during each time duration the gain approximations of the standard reverberation curve on the subsequently stored gains when the gain approximations or the subsequently stored gains are applied to the preamplifiers. This adaptive time varied control apparatus eliminates noise due to the momentary average reverberation in the medium of operation.

In accordance with another aspect of this invention, there is provided an own doppler nullifier for extracting the own ship's doppler information from a digital beam output signal of a beamformer to obtain target doppler information. The own doppler nullifier introduces an offset frequency A to the digital beam output signal which offset is a function of the beamformer sampling frequency. The own doppler nullifier apparatus and method also provides for the generation of a digital signal representative of the own ship's doppler information and offsetting the digital signal by a frequency amount B which is a function of the beamformer sampling frequency and offset frequency A. The generated digital signal and the beam output signal are multiplied together to obtain a signal having a difference frequency component and a sum frequency component. Both frequency components will lie in their respective difference frequency and sum frequency bands. The difference frequency band will have a center frequency which is offset by an amount A-B whereby the affect of noise due to fold-over from the negative frequency band into the difference frequency band is eliminated. The own doppler nullifier provides for the sum frequency component to be filtered out leaving only the difference frequency component corresponding to the target doppler information.

The own doppler nullifier makes if possible to digitally filter the sum frequency component and difference frequency component of the mixed generated digital signal and digital beam output signal. The introduction of the offsets shifts the difference frequency component away from any affects of noise due to fold-over from the negative frequency band. Moreover, the offsets introduced to the signals shifts the sum frequency component further away from the difference frequency component to make the filtering of the sum frequency component from the difference frequency component possible.

It should be understood that the offset frequency A may be chosen as the difference between the transmitted frequency of the sonar receiver minus the nearest lower multiple of the beamformer sampling frequency to that transmitted frequency. It should be understood that offset frequency B may be chosen to be equal to half the beamformer sampling frequency less offset frequency A so as to provide the optimum result.

For a better understanding of the nature and objects of the invention, reference may be had to the following detailed description taken in conjunction with the accompanying diagrammatic drawings in which.

TABLE I-continued

| Stave No. | Location in array | α (degrees) | Delay in uS. |
|---|---|---|---|
| S6 | C + 5 | +50 | 146.0 |
| S5 | C + 4 | +40 | 95.7 |
| S4 | C + 3 | +30 | 54.8 |
| S3 | C + 2 | +20 | 24.7 |
| S2 | C + 1 | +10 | 6.2 |
| S1 | C(center) | 0 | 0 |
| S36 | C − 1 | −10 | 6.2 |
| S35 | C − 2 | −20 | 24.7 |
| S34 | C − 3 | −30 | 54.8 |
| S33 | C − 4 | −40 | 95.7 |
| S32 | C − 5 | −50 | 146.0 |
| S31 | C − 6 | −60 | 204.5 |

By taking samples of the individual stave signals at moments in time corresponding to the delay times for those staves, the stave signals will appear in phase and can be summed to form a beam output signal.

Due to the symmetry of the array the wavefront impinges simultaneously on staves C+i and C−i of the array allowing these staves to be sampled at the same time, where i is an integer greater than or equal to 0 and less than or equal to 6. In order to form a beam it is thus necessary only to take samples at i+1 moments in time.

Figure 1:
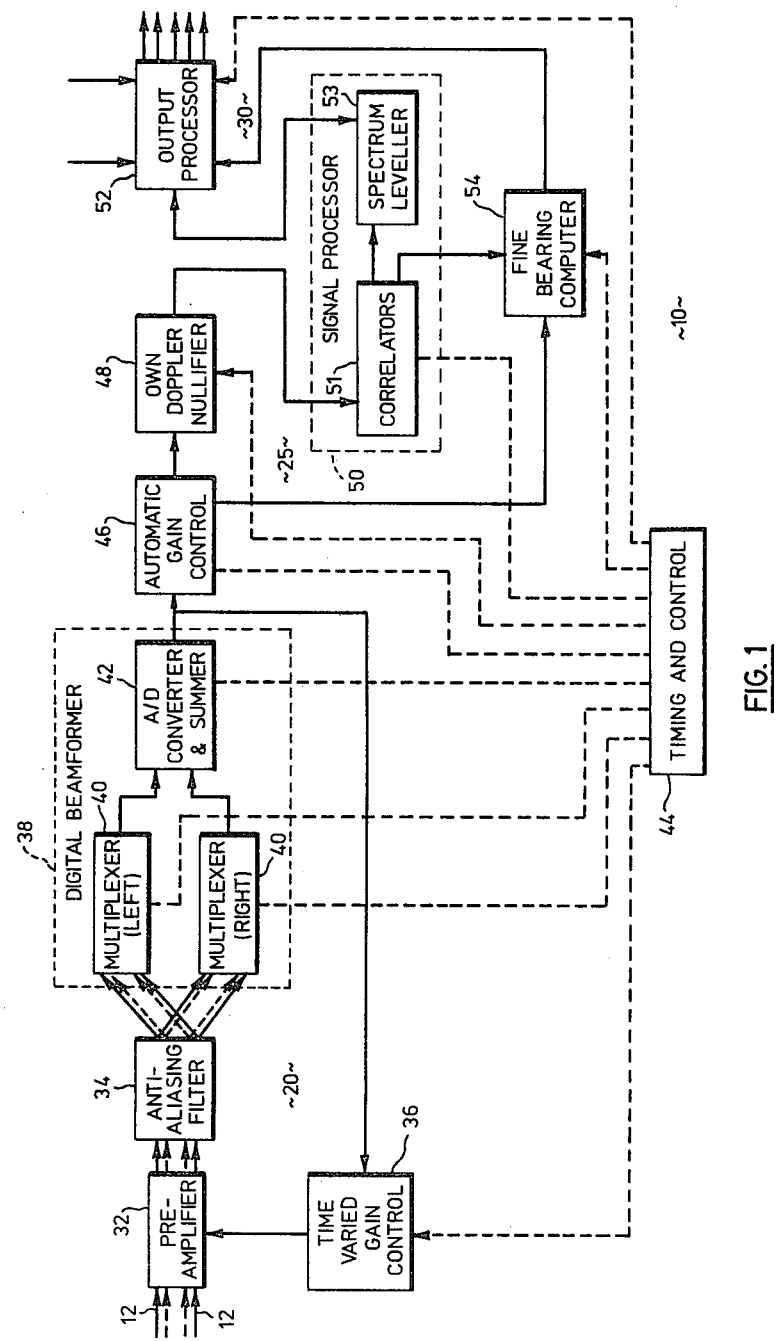
FIG. 1 shows a block diagram for a digital sonar receiver.

The beamformer 38 of FIG. 1 utilizes a method of interleaved sampling. The interleaved sampling method samples individual stave elements at different moments in time which approximate the delay times of Table I. The stave elements are sequentially sampled, in such a fashion that continuous, uniformly spaced samples are obtained.

Figure 2:
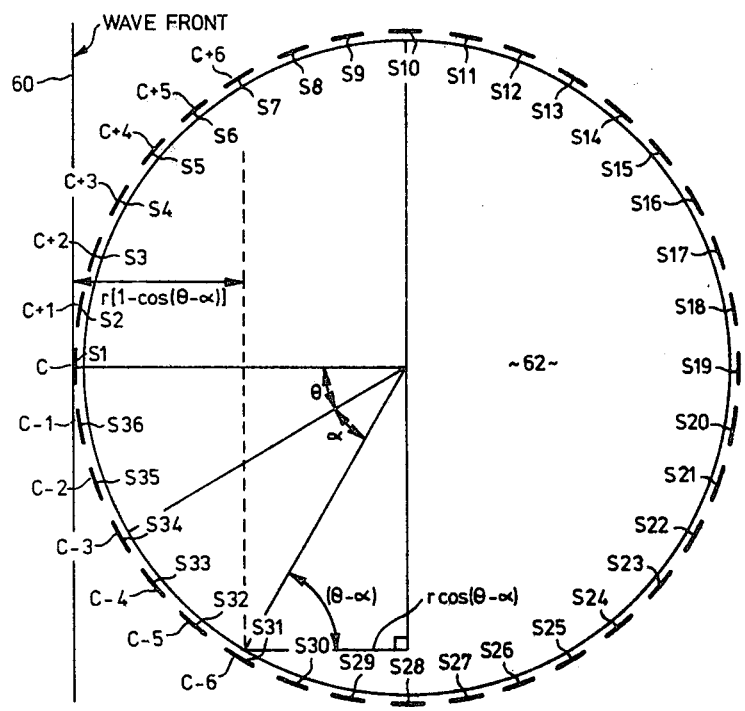
FIG. 2 is a schematic representation of a circular transducer array showing a wave front impinging the transducer array.

To form one beam corresponding to each stave element of FIG. 2, 7 sample-sets must be taken for each beam. Therefore the total number of samples to be taken is:

$$Z = Mn = (36)(7) = 252$$

where M is the total number of beams to be formed (equal to 36) and n is the total number of sample-sets (equal to 7). Because each sample is taken at one moment in time, Z represents the total number of moments in time samples are to be taken.

The sampling method samples each i element symmetrically disposed to the right and left of the beam m, being formed during each consecutive sampling interval z. It should be understood that o i n−1 (or o i 6 for n=7). Each sampling interval corresponds to one moment in time of the 252 different moments in time for Z.

The time duration of each sampling interval is chosen such that the received sonar signal may be adequately reproduced digitally. A total bandwidth deviation of 800 Hz for the received signal from the transmitted signal requires a sampling frequency of at least 1,600 Hz to adequately reproduce the received signal digitally. The time duration of the sampling interval is chosen to be a function of the first delay of 6.2 μS from Table I. Table II shows the calculation of different time durations. The inverse of the time duration is also given which represents the sampling frequency. From Table II a sampling frequency of fs=3200 Hz is chosen giving the time duration of each sampling interval as 1.24 μS.

TABLE II

| | Time Duration of the Sampling Interval | |
|---|---|---|
| X | $\tau_0 = \dfrac{6.2\ \mu S}{X}$ | Sampling Frequencies (fs = $10^6/252 \cdot \tau_0$ Hz) |
| 1 | 6.2 | 640 |
| 2 | 3.1 | 1280 |
| 3 | 2.07 | 1920 |
| 4 | 1.55 | 2560 |
| 5 | 1.24 | 3200 |
| 6 | 1.04 | 3840 |
| 7 | 0.89 | 4480 |
| 8 | 0.78 | 5120 |

To obtain a uniform spaced sampling rate the exact delays given in Table I are approximated as an integer number of sampling intervals. The approximated delays, di, are chosen such that the quotient of the approximated delay di when divided by the total number of sample-sets n=7 has a different integer remainder for each value of i. Table III shows how di is chosen so that its remainder is different for each value of i.

TABLE III

| i | Time Delay (sec) | Time Delay 1.24 μS. | di | Remainder of di/7 |
|---|---|---|---|---|
| 0 | 0 | 0 | 0 | 0 |
| 1 | 6.21 | 5.008 | 5 | 5 |
| 2 | 24.67 | 19.89 | 20 | 6 |
| 3 | 54.80 | 44.19 | 44 | 2 |
| 4 | 95.69 | 77.17 | 78 | 1 |
| 5 | 146.10 | 117.82 | 116 | 4 |
| 6 | 204.50 | 164.91 | 164 | 3 |

It should be understood from Table III that because di is a function of the time duration of the sampling interval, i may be determined for any consecutive sampling interval from the remainder di/7 which is equal to the remainder of z/7. Moreover the samples taken during each consecutive sampling interval correspond to beam m where:

$$m = \text{Remainder}\left[\dfrac{\dfrac{z - di}{n} + M}{M}\right] + 1 \qquad 1$$

$$m = \text{Remainder}\left[\dfrac{\dfrac{z - di}{7} + 36}{36}\right] + 1$$

where i is known for any di per Table III and di is known for any z (because Remainder [di/7]=Remainder [z/7]).

Figure 3:
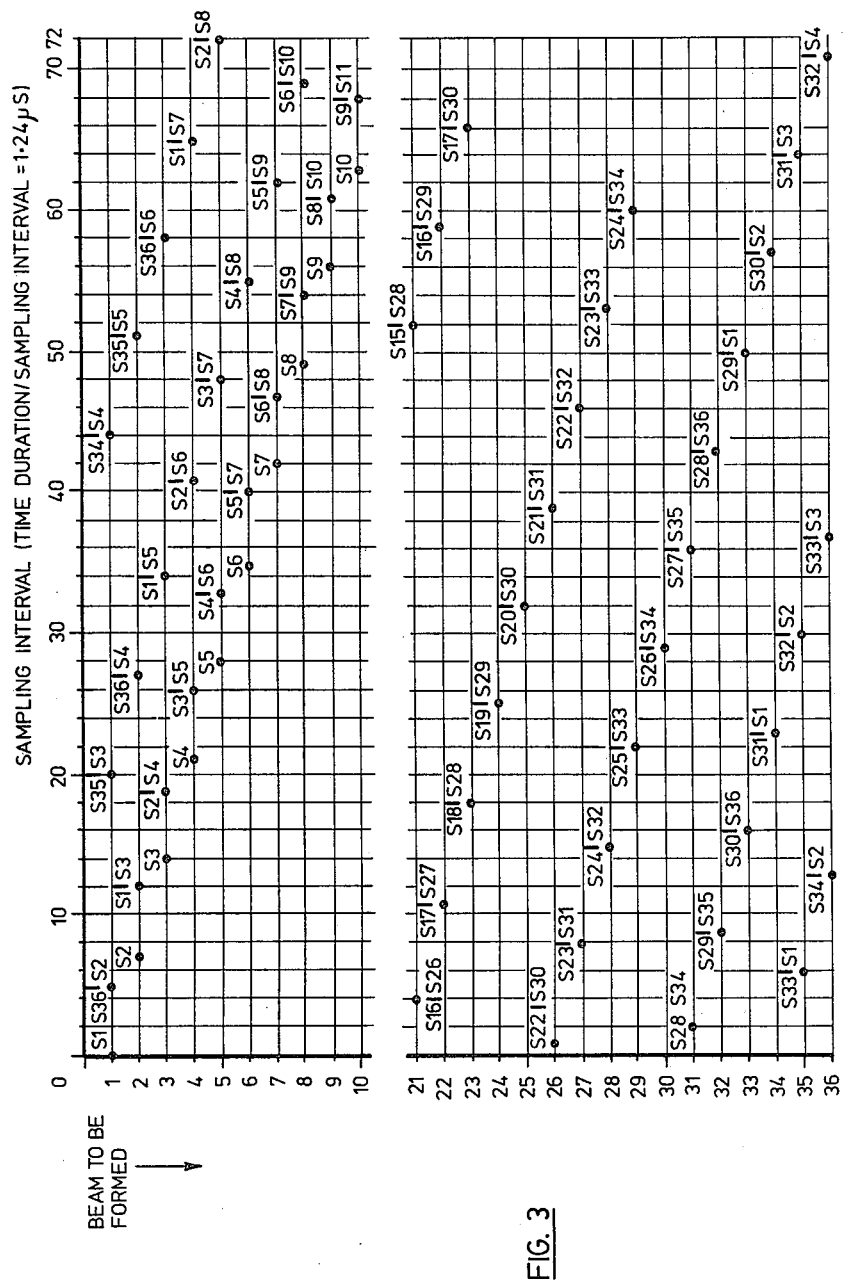
FIG. 3 is a timing diagram showing a partial sampling schedule for the digital beamformer.

Referring now to FIG. 3 the timing diagram for the sampling schedule may be derived by calculating for each sampling interval the sample-set to be sampled and the beam to which it corresponds. For example, from FIG. 3, during the time duration of the 25th sampling interval stave elements S19 and S29 are sampled for beam 24. This information may be calculated from the above equations because for z−25:

Remainder [di/7] = Remainder [z/7]
= Remainder [25/7]
= 4

Figure 5:
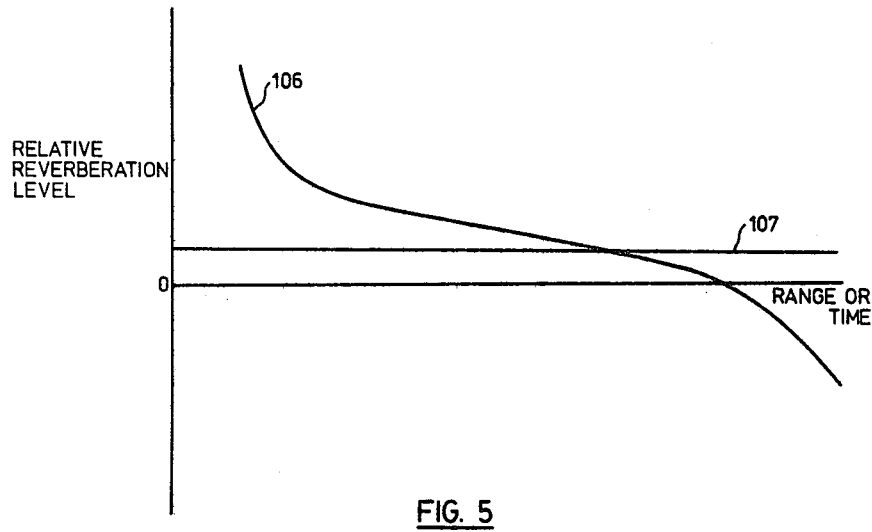
Figure 6:
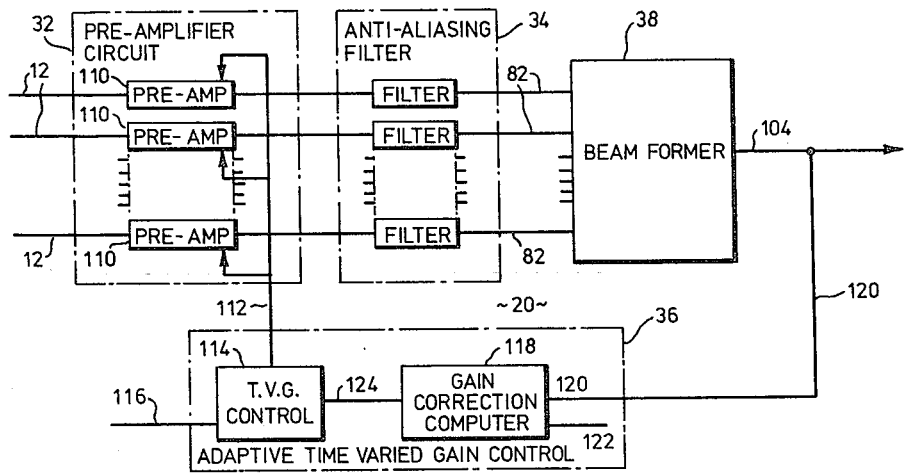
Figure 7:
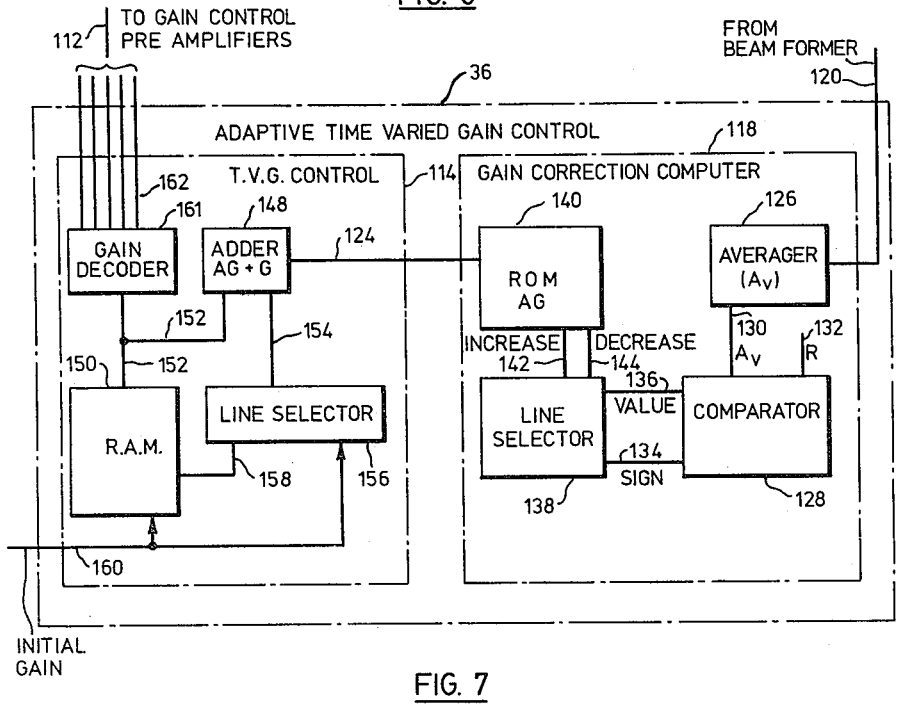
Figure 9:
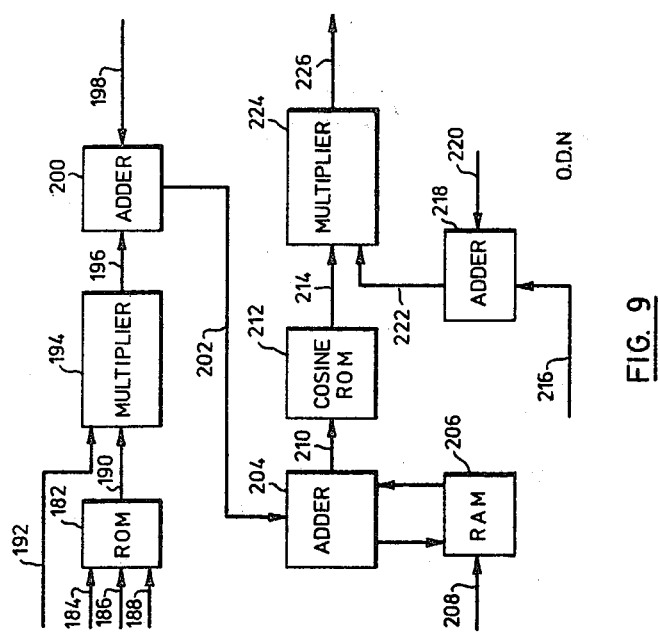
Figure 8A:
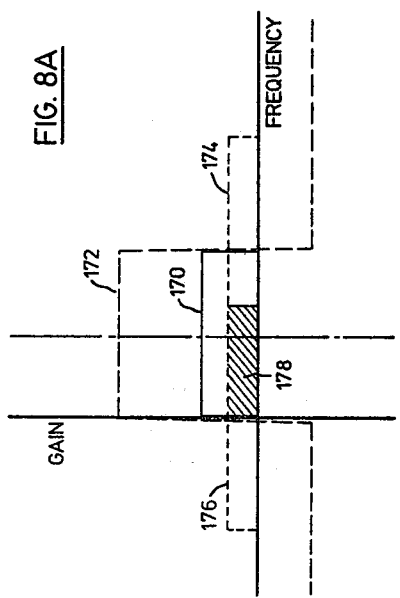
Figure 8B:
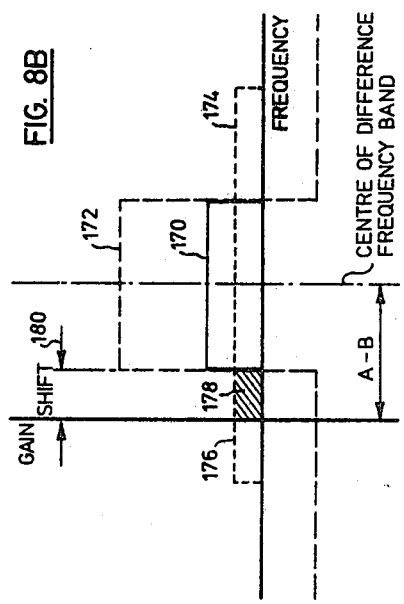

From Table III for a remainder of 4, di=116 and i=5. From equation 1:

FIG. 5 shows a "standard" reverberation curve, and the affect of ambient noise on such a curve (on the same sheet as FIG. 2);

FIG. 6 is a block diagram for the input section of the sonar receiver;

FIG. 7 is a block diagram for the adaptive time varied gain controller;

FIGS. 8A and 8B show the affect of noise on the difference band before and after the band is shifted by frequency amount A-B;

FIG. 9 is a block diagram for the own doppler nullification apparatus.

Referring now to FIG. 1, a block diagram for the digital sonar receiver 10 is shown. The digital sonar receiver 10 receives sonar signals from a multi-element transducer array corresponding stave line 12. The stave lines 12 apply the sonar signals to the input section 20 of the receiver 10. Input section 20 reduces the dynamic range of the signals, converts the signals to digital and forms beam outputs for subsequent analysis. Processing section 25 analyses the digital beam output data and extracts target information is then fed to output section 30 and subsequently onto a display or any other suitable means, for example, a recorder.

The input section 20 of receiver 10 comprises a plurality of staves in a circular multi-element transducer array (not shown) where each stave is connected to a preamplifier in preamplifier circuit 32 by line 12. Each output of the preamplifier is connected to the input of an anti-aliasing filter of filter circuit 34. In order to reduce the large dynamic range at the input of receiver 10, each preamplifier of circuit 32 has a variable gain which is, by means of an adaptive time-varied gain controller 36, adjusted to be inversely proportional to the momentary value of the average reverberation level. The adjustment of the preamplifier circuit's gain achieves reverberation background level normalization. The time varied gain controller receives information via the beamformer 38, which samples the received signals, as to the momentary reverberation level. Reducing the dynamic range of the sonar signals reduces the digital word length required to represent the signal in the subsequent processing.

The sonar signals once having their background noise level normalized by preamplifier circuit 32 are fed to the anti-aliasing filter circuit 34. Circuit 34 comprises a plurality of anti-aliasing filters where for each preamplifier there is a corresponding filter. Each anti-aliasing filter includes a band pass filter, with the center frequency set to correspond to the frequency of the transmitted signals. The width of the band of frequencies passed by the filter will be determined by the maximum expected doppler shift between the target echo and the transmitted signal. The function of the anti-alias filters is to eliminate the passing of signals in the so called "alias" frequency bands, introduced by the subsequent sampling process. At the same time the signal to noise ratio is improved, because of the reduction in the bandwidth. As a result of the reduction in the dynamic range the sampling and subsequent digital processing can be performed more economically.

Beamformer 38 samples the signals through multiplexers 40 and converts the signal into digital format by A/D converter and summer 42. The beamformer forms one beam for each related stave by sampling the staves symmetrically disposed about the related stave as well as the related stave itself and weighting the samples before adding them together to form the beam. Timing and conrol circuit 44 controls sampling by implementing a sampling method, which interrogates the staves in an interleaved fashion and forms the beams sequentially.

The full beam output signal, in digital format, is passed through automatic gain controller 46 of processing section 25. The automatic gain controller increases or decreases the gain of each beam independent of the other beams after a comparison of the actual beam output with the average output of a number of preceding samples for that beam.

The gain adjusted beam output, is passed through own doppler nullifier device 48 which eliminates the effect of the own ship's doppler on the frequency of the signal.

The signal now enters a signal processor 50 which correlates the received signal with a plurality of predetermined independently stored signals, so called "replicas". The best correlation will be indicative of the velocity of the target in that beam. Such a correlation is performed for each beam in sequence. The output is sent to the output processor 52 of output section 30.

A fine bearing computer 54 is included in processor section 25, which combines information from the automatic gain control 46 and the signal processor 50 to more accurately compute from which direction within a beam the target information is received. This information is fed into the output processor 52.

The output processor 52 receives information regarding the beam, target velocity and time since transmission, and combines this information with inputs indicating the velocity of sound in water, and the ship's course. From this the output processor 52 produces a digital signal which is indicative of the range, bearing, doppler, fine bearing, and ships heading, in a format adapted to the display circuitry.

FIG. 2 shows planar wavefront 60 impinging on cylindrical transducer 62 containing a number of elements (staves) around its periphery, e.g. 36 staves at 10° angular separation, designated S1 through S36. Beams may be formed by suitably combining the signals from a number of contiguous staves. In this case an array of 13 contiguous staves is used to form a beam.

The signal generated in any stave of the array is delayed with respect to the signal at the point of incidence upon the transducer. This delay may be expressed as:

$$d = r/c[1 - \cos(\theta - \alpha)]10^{+6} \, \mu S,$$

where:
- r = the radius of the transducer in feet;
- c = velocity of sound in water in feet/second;
- $\theta$ = the angle between the direction of travel of the incident wavefront and the axis of the array (in degrees);
- $\alpha$ = the angle between the axis of the stave considered and the axis of the array (in degrees).

($\alpha$ & $\theta$ are considered positive in the clockwise direction).

For a transducer radius of 2 feet and a velocity of sound in water assumed at 4,890 feet/second, a wavefront travelling along the axis of the array ($\theta = 0°$) will generate signals in the 13 staves, delayed as shown in Table 1.

TABLE I

| Stave No. | Location in array | α (degrees) | Delay in uS. |
|---|---|---|---|
| S7 | C + 6 | +60 | 204.5 |

$$m = \text{Remainder} \left[ \frac{\frac{25-116}{7} + 36}{36} \right] + 1$$

$$= \text{Remainder } [23/36 + 1]$$
$$= 23 + 1$$
$$= 24$$

Hence, stave elements $m \pm i$ are sampled which corresponds to $S24 \pm 5 = S19$ and $S29$.

Referring to FIG. 3 a repetitive sampling sequence can be seen. At time intervals 0, 7, 14, etc. the first sample-set for every beam is sampled. The sequence is dependent upon the remainders of $di/7$. The delay associated with the sample to be taken corresponds to the remainder of $di/7$. The first sample in the sequence is for $di/7$ having a remainder of 0 corresponding to the sample not delayed in time $(i=0)$. The second sample is for remainder $di/7 = 1$ corresponding to $i = 4$, the third for remainder $di/7 = 2$ corresponding to $i = 3$ and so on until the last sample in the sequence is for remainder $di/7 = 6$ corresponding to $i = 2$. The delays that correspond to these samples are a function of the rounding of the time delays to be a multiple of the time duration for the sample interval. It should be understood that this sequence repeats itself after every 7 sampling intervals because the number of sample-sets n has been chosen equal to 7.

Figure 4:
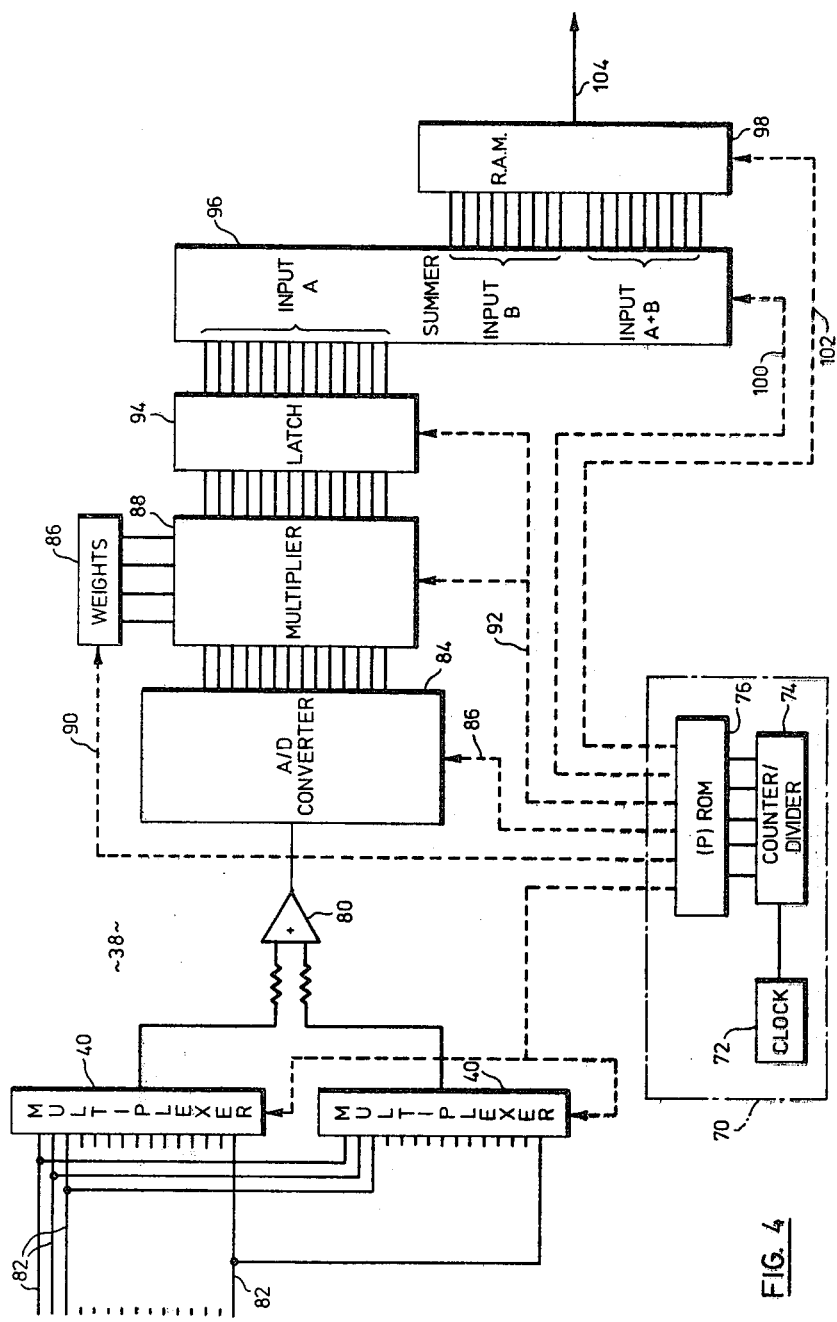
FIG. 4 shows a schematic diagram of the digital beamformer.

FIG. 4 is a schematic diagram for the digital beamformer 38 of FIG. 1. The timing and control circuitry is shown within line 70 comprising clock 72, counter/divider 74 and a programmable read only memory (PROM) 76. The timing diagram of FIG. 3 is stored in PROM 76. PROM 76 accesses multiplexers 40 of the beamformer to sample input lines 82 in accordance with the interleaved sampling method of FIG. 3. Lines 82 separate to feed both multiplexers 40. There are 36 input lines 82 (one for each stave element). The two multiplexers are used so that symmetrically disposed staves may be simultaneously sampled.

The sonar signals entering the beamformer 38 via input lines 82 have had their background noise level normalized by preamplifiers 32 and have had their bandwidth reduced to 800 Hz by anti-aliasing filter 34 (see FIG. 1). Using the sampling frequency of 3200 Hz the combined sampling rate of input lines 82 by multiplexers 40 will be (252 samples × 3200 Hz=) 806,400 samples per second.

Multiplexers 40 interrogate sonar signals on input lines 82. The two symmetrically disposed input lines are interrogated by multiplexers 40 and summed by analogue summer 80 prior to A/D convertion. PROM 76 will access only one multiplexer when only one input line is to be sampled such as for the first sample in the formation of any one beam. In this instance, the output of this one multiplexer is summed with a nil output from the other multiplexer resulting in a sum which is indicative of the sample itself. The summation is done in analogue because it is quicker and more economical summing the symmetrically disposed staves prior to A/D conversion. The analogue sum leaves summer 80 and is converted to digital format by A/D converter 84.

A pulse generated by PROM 76 on line 86 initiates the A/D conversion. The output of the A/D conversion is shown to be an 8-bit word which is multiplied by weighing factors supplied by weight circuitry 86 to multiplier 88. The timing and control issues pulses from PROM 76 along lines 90 and 92 to initiate the multiplication. The weighing factors are chosen with respect to which samples of the beam are being taken. For the first sample the weighing factor will be unity. The other weighing factors may be a fraction less than unity so as to aid in suppressing side loops. The output of the multiplier is fed into latch 94 which transfers the 8-bit word representing the sampled signal to digital summer 96.

Digital summer 96 adds all weighted samples to all other samples of their respective sample-set which when summed forms a beam output signal. Summer 96 utilizes Random Access Memory (RAM) 98 which stores the partial sums of each beam output signal to be formed. Pulses sent from PROM 76 to along line 100 initiates the summation of each new sample entering input A with the partial sum of its sample-set entering at input B. This new partial sum A+B is then stored in RAM 98 at an address indicated by bus 102 from PROM 76. Bus 102 also addresses RAM 98 to bring the partial sum of the sample-set to be summed in summer 96 with each of its new samples.

RAM 98 stores a partial sum for each beam to be formed. In this case 36 beams are being formed so RAM 98 must store 36 partial sums. RAM 98 outputs on bus 104 digital words representing each full beam output signal. Each full beam output signal is fed from the beamformer only after all 7 samples of the sample-set for the beam output signal have been summed. At this time the RAM 98 clears that memory location which is used to keep the partial sum so that a new output signal can be formed in that direction.

The beamformer 38 outputs a beam every [7 samples × 1.24 μs (the time duration of the sampling interval)] = 8.68 μs. Hence, the beamformer which samples at a rate of 806,400 samples per second will output approximately 115,200 full beam output signals every second.

It should be apparent that the beamformer requires the fastest operating hardware. Processing section 25 (FIG. 1) need not work at such a fast rate which makes for more economical hardware.

Besides the full beam output signals being fed into processing section 25 (FIG. 1) they are also fed back into adaptive time varied gain control (A.T.V.G.) 36 (FIG. 1). The A.T.V.G. control 36 compensates for the reverberation decay as a function of range, variations in the overall level of the reverberation decay curve, and sudden variations in the slope of the decay curve (reverberation bumps). FIG. 5 shows a typical reverberation curve 106 as a function of range or time. As reverberation curve 106 decays it falls below the ambient noise 107 when then becomes the dominant noise. Reverberation is the energy from the transmitted pulse being reflected back to the receiver where the reflection is caused by discrete particles and marine life resident in the medium, as well as the reflection and back-scattering which occurs at the boundaries. The A.T.V.G. control 36 reduces the large dynamic range of the received sonar signals which may be in the excess of 120 dB by varying the gain of the preamplifier 32 to be inversely proportional to the momentary value of the average reverberation.

The A.T.V.G. control which is subsequently described has been developed making the assumptions that the reverberation level in all directions around the ship is uniform, variations in reverberation level between successive ping-cycles are not unacceptably large and gain control in steps of 1 dB is acceptable.

Referring now to FIG. 6 the preamplifiers 110 of preamplifier circuit 32 contain gain stages controllable over a range of 63 dB in 1 dB steps. A binary code is fed into the preamplifiers 110 along control bus 112 from T.V.G. (Time Varied Gain) control 114. Initially, during the first ping-cycle, the gain of preamplifiers 110 follows a fixed, predetermined pattern, gradually increasing from minimum to maximum to compensate for an assumed "standard" reverberation curve. This "standard" reverberation curve may be introduced into the T.V.G. control 114 along initial gain profile bus 116. The "standard" reverberation curve may correspond to the reverberation curve 106 of FIG. 5. The instances at which the gain changes are to be made have been derived from the "standard" reverberation curve and are stored in the T.V.G. control 114.

It should be understood that the period between gain changes is dependent upon the time it takes for the reverberation to drop 1 dB. Normal reverberation close to the ship is large and decreases almost exponentially as the range increases. At some point in time the reverberation level falls below that of ambient noise and hence need not be considered. The A.T.V.G. does not deal with the affects of reverberation at ranges where the reverberation has fallen below the ambient noise level in the medium.

During the period between gain changes, a large number of full beam outputs from beamformer output bus 104 are fed into gain correction computer 118 via bus input 120. Gain correction computer 118 averages all these beam output signals. The average is then compared in gain correction computer 118 with the desired full beam output signal which is introduced via reference input bus 122. Any discrepancies between the desired output signal and the average is an indication that for this interval between gain changes a gain correction is required. If $\Delta G$ represents the gain correction then the gain correction required is:

$$\Delta G = -20 \log Av/R$$

where
Av = average of the beamformer full beam output signals
R = the desired full beam output.

For each period between gain changes gain correction computer 118 computes the value of the gain correction, $\Delta G$. The gain correction, $\Delta G$, is fed into T.V.G. control 114 along bus 124. The T.V.G. control 114 adds the gain correction to the previous gain for that interval. It should be understood that the gain correction may be a positive or a negative value. The new gain values obtained from the sum are then stored in the T.V.G. control 114. During the next ping-cycle, i.e. the maximum time between which a pulse is transmitted and received, the new gain values are applied to the preamplifers 110. This process is repeated on subsequent ping-cycles so that the gain-time profile is continually revised to match the current characteristics of the medium. The length of a ping-cycle may be in the order of 30 seconds. Because the range of the target corresponds to time, different gains are applied to the preamplifiers as the time of the ping-cycle increases.

Because all the inputs are controlled simultaneously by the same control lines, beam-to-beam variations in normalization will occur, which are removed in a beam oriented A.G.C. (adaptive gain control) stages 46 (FIG. 1) following the beamformer 38.

The exact computation of $\Delta G$ is a complicated and time consuming process for the gain correction computer because of the logarithmic function. The gain correction computer of this application uses a simple algorithm. For any number of dB's required for gain correction, the ratio Av/R can be expressed as a simple binary fraction, with sufficiently close approximation. For example, if the gain correction ($\Delta G$) is to be $-8$ dB, then 20 log Av/R = 8, thus Av/R = 2.511 or Av/R would approximately equal 2.5. It would then follow that
Av/R = 2.5
Av = 2.5 R
A − R = 1.5 R
for R chosen to be unity.
Av − 1 = 1.5

The converse of this would apply and if Av − 1 = 1.5 a gain correction of $-8$ dB would be required. Table IV shows a binary code which has been generated for gain decreases.

TABLE IV

| $\Delta G$ (dB) −20 log Av/R | Ratio Av/R Exact | Ratio Av/R Fraction | Difference Av-R Fraction | Difference Av-R Binary Code |
|---|---|---|---|---|
| 1 | 1.122 | 1⅛ | ⅛ | 0000.001 |
| 2 | 1.259 | 1¼ | ¼ | 0000.010 |
| 3 | 1.412 | 1⅜ | ⅜ | 0000.011 |
| 4 | 1.585 | 1½ | ½ | 0000.100 |
| 5 | 1.778 | 1¾ | ¾ | 0000.110 |
| 6 | 1.995 | 2 | 1 | 0001.000 |
| 7 | 2.239 | 2¼ | 1¼ | 0001.010 |
| 8 | 2.512 | 2½ | 1½ | 0001.100 |
| 9 | 2.818 | 2¾ | 1¾ | 0001.110 |
| 10 | 3.162 | 3⅛ | 2⅛ | 0010.001 |
| 11 | 3.548 | 3½ | 2½ | 0010.100 |
| 12 | 3.981 | 4 | 3 | 0011.000 |
| 13 | 4.467 | 4½ | 3½ | 0011.100 |
| 14 | 5.012 | 5 | 4 | 0100.000 |
| 15 | 5.623 | 5⅝ | 4⅝ | 0100.101 |
| 16 | 6.310 | 6¼ | 5¼ | 0101.010 |
| 17 | 7.079 | 7⅛ | 6⅛ | 0110.001 |
| 18 | 7.943 | 8 | 7 | 0111.000 |
| 19 | 8.913 | 8⅞ | 7⅞ | 0111.111 |
| 20 | 10.000 | 10 | 9 | 1001.000 |
| 21 | 11.22 | 11¼ | 10¼ | 1010.010 |
| 22 | 12.59 | 12⅝ | 11⅝ | 1011.101 |
| 23 | 14.13 | 14⅛ | 13⅛ | 1101.001 |
| 24 | 15.85 | 15⅞ | 14⅞ | 1110.111 |

It should become apparent from Table IV that for any number of dB's the gain correction may be obtained from a read only memory which may be addressed by the binary code obtained from the difference of Av − R.

FIG. 7 is a block diagram showing the A.T.V.G. control 36 in greater detail. Beam output signals from the beamformer are fed back via bus 120 to averager 126. Averager 126 accumulates a large sample of beam outputs and averages them once every period between gain changes. It should be understood that during one scan 36 beam outputs are formed. Because it has been found that the minimum period for gain change is about 20 mS 32 beam output signals may be added for 32 scans. The four beams aft of the ship are excluded due to high propellor noise. Hence for each period between gain changes averager 126 sums 32 beam output signals 32 times and divides this summation by 1024. Division in the case of a digital signal only requires shifting. The average is fed into comparator 128 along bus 130. Comparator 128 substracts desired value R on bus 132 from the average value. Comparator 128 outputs the sign value and difference value on respective buses 134 and 136 to line selector 138. The line selector 138 uses the sign bit to determine if the gain should be increased or decreased. If the gain should be increased line select 138 accesses read only memory (ROM) 140 by increase bus 124 causing ROM 140 to output the gain correction increase at the address location determined by the difference value. If the gain should be decreased line select 138 accesses ROM 140 by decrease bus 144 to output the gain correction decreases from ROM 140 at the address location determined by the difference value.

ROM 140 feeds the gain correction along bus 124 and into adder 148. Adder 148 take the gain correction value and adds it to the previous gain stored in Random Access Memory (RAM) 150 which enters adder 148 via bus 152. The sum represents the new gain and is outputted on bus 154 to the line selector 156. The line selector inputs the new gain into the RAM 150 via bus 158. During the initial ping-cycle the assumed reverberation curve information and initial gain is deposited in RAM 150 and line selector 156 by way of bus 160. RAM 150 outputs the gain to the gain decoder 16 along bus 152. The gain decoder 161 codes the new gain and outputs the coded gain on plurality of lines 162 of control channel 112 which adjusts the gain of the preamplifiers for each period between gain changes. Hence the T.V.C. control 114 computes the new gain while simultaneously using the previous gain to control the preamplifiers.

Now referring again to FIG. 1 the first stage of processing section 25 is the automatic gain control (AGC) stage 46. The AGC controller 46 increases or decreases the gain of each full beam output signal independent of the other beam output signals after a comparison of the actual beam output signal's gain with the average gain of all the beam signals of that beam. The AGC controller 46 eliminates any beam-to-beam variations in normalization which may occur from the A.T.V.G. control 36. The beam output signal from AGC 46 is fed into the own doppler nullifier (O.D.N.) and fine bearing computer 54.

Although the function of the O.D.N. 48 (FIG. 1) has been previously described to reduce the full beam output signal to half by taking away the own ship's doppler effect on the signal, some of the principles of the O.D.N. should now be discussed.

Sonar echo signals, the signals to be detected, are generally received at a frequency which differs from the transmitted frequency. The difference is known as the doppler effect which is due for the most part to the relative motion of the target with respect to the ship.

In order to extract the target doppler from the total doppler it is necessary to remove the doppler effect of the own ship's motion. The O.D.N. involves the mixing of the received beam formation's frequency with a local frequency which corresponds to the ship's doppler followed by filtering out the sum frequencies obtained when the frequencies are mixed.

In order to reconstruct the original target information from the sonar signals entering the receiver the sampling rate of the receiver must be at least twice the highest signal frequency present. However, because the receiver of the present application incorporates anti-aliasing filters at the input of the receiver, the sampling frequency is reduced to at least twice the band of frequencies passed through the anti-aliasing filters. It should be understood that the desired frequency band may be "folded" into the baseband. The so called folding frequencies occur at multiples of half the sampling frequency. Signals occurring at multiples outside the desired band will also be folded into the baseband. Such frequencies are called "aliases". The purpose of the anti-aliasing filters is to restrict the frequency range to the desired band and thus suppress signals in any other band. The mirror image of the baseband extending from 0 Hz into the negative frequency region cannot be eliminated.

The doppler effect of the beam output signal may vary from a minimum of $f_t - f_{td}$ to a maximum of $f_t + f_{td}$, where $f_t$ represents the transmitted frequency and $f_{td}$ represents the total doppler shift.

If the sampling frequency is chosen for the minimum received frequency to be a multiple of the sampling frequency, as is the case in the receiver of this application, the received frequency of the beam output signal will always fall in the band of $(a)(fs)$ to $2a + 1/2\ fs$, (where a is an integer and fs the sampling frequency). The sampling frequency will be folded into the baseband from 0 to fs/2. The frequency of the received beam output signals is then:

$$f_e = f_{do} + f_{td},$$

where $f_{do}$ is the frequency of zero total doppler and $f_{td}$ is the total doppler shift which may have positive as well as negative values.

As indicated earlier the maximum doppler shift of the frequency about the transmitted frequency was chosen to be 400 Hz. The value of maximum doppler was chosen by assuming that the maximum ship speed and target speed were each 40 knots. Given a conversion factor of 5 Hz/knt, the maximum speed of 80 knts becomes a doppler shift of 400 Hz ($= 80$ knt·5 Hz/knt).

If this low frequency received beam output signal, $f_e$, is mixed with a frequency proportional to the own ship's doppler (a known variable), the resulting difference component will no longer contain the own ship's doppler. This resultant frequency is proportional to the target doppler.

During the mixing process within the O.D.N. device the following should be considered:

1. In addition to the difference frequency the output of the mixer will contain the sum frequency, which is to be filtered out.

2. Since the doppler is variable, the sum and difference frequencies will each require a frequency band. These frequency bands must be separated sufficiently so that the above filtering in the above paragraph may be done.

3. The effective noise bandwidth of the anti-aliasing filter may be assumed to be not more than 1.5 times the passband. This means that the noise bandwidth of the difference signal will be considerably larger than the band required for the actual signal frequencies. In order to obtain a maximum S/N enhancement the center of the difference frequency band must be shifted to the right, so that the portion of the noise band in the negative frequency region, when folded over, falls outside the desired difference band. This is clearly shown in FIGS. 8A and 8B. FIG. 8A shows the effect fold over of noise on the desired difference frequency band 170. The filter response is designated as 172 having a noise band 174. As shown in FIG. 8A the noise band in the negative frequency region 176 folds over into the desired band as indicated by shaded area 178. This folding affect effectively increases the noise in the desired difference frequency band 170. Referring now to FIG. 8B shifting the center frequency of the difference band 170 to the right by desired amount 180 will result in the folded over noise from the negative frequency region, as indicated by shaded area 178, falling outside of the desired difference frequency band 170.

4. The requirements of paragraphs 2 and 3 above may be satisfied by introducing an "offset" in the relation between the beam output signal frequency and sampling frequency, and also in the local oscillator frequency.

The offset in the beam output signal frequency entering the O.D.N. device may be defined as:

A = (transmitted frequency)—(nearest lower multiple of sampling frequency with respect to the transmitted frequency) and the local oscillator frequency is defined by:

$f_m = B +$ own ship's doppler, where B is the offset in the oscillator frequency.

It should be understood that the optimum solution is obtained when:

$A + B = f_s/2$ and the center of the difference band (A − B) is located as shown in FIG. 8B.

Referring now to FIG. 9 there is shown an O.D.N. device which takes into consideration the frequency techniques previously mentioned in the mixing operation.

A read only memory (ROM) 182 is shown addressed by three buses 184, 186 and 188. ROM 182 outputs a value K on bus 190 which corresponds to the value of:

$K = f_t/c \, \text{COS} \, \beta$, where $f_t$ = transmitted frequency,

COS $\beta$ = beam angle relative to the bow of the ship, and c = the velocity of sound in water (V.O.S.I.W.).

The ROM 182 is used to store predetermined values of K for different values of $f_t$, c and COS $\beta$, thereby eliminating lengthly computation times. The valve of K read from ROM 182 corresponds to the information on the three address buses. Address bus 184 is indicative of the transmitting frequency which is a known variable. Address bus 186 is indicative of the V.O.S.I.W. for which certain values have been calculated. Lastly, address bus 188 is indicative of the beam angle with respect to the bow of the ship, $\beta$. Because the direction of the beam being processed is known, a signal indicative of the beam may address ROM 182. In summary, ROM 182 outputs a value K which represents a predetermined computation for selected known input values of the transmitting frequency, beam angle and V.O.S.I.W.

The value K is multiplied with the own ship's speed, a known variable U inputted on bus 192 to multiplier 194. The result of the multiplication is outputted on bus 196 and corresponds to the doppler effect of the ship, $f_{os}$, where:

$f_{os} = U \times f_t/c \, \text{COS} \, \beta$

The own ship's doppler, $f_{os}$, is then added in adder 200 with offset B introduced on bus 198. The adder 200 may perform the addition in 2's compliment arithmetic so that the output on bus 202 is $f_m = B \pm f_{os}$. The plus or minus sign are indicative of the ship moving forward or backward, respectively. At this point (bus 202) the O.D.N. device has determined the proper value for the own ship's doppler effect and offset this value by B to give the offset in the local oscillator frequency, $f_m$.

The O.D.N. has now to produce for each beam output signal a string of samples which represent the function:

COS $(2\pi \cdot f_m \cdot b \cdot \Delta t)$, where $t = 1/f_s$ . . . (the sampling frequency, the interval between samples of the same beam), and b = is a succession of integer values 1, 2, 3 etc.

The cosine value is to be multiplied with the beam information to obtain the desired difference band.

It should be understood that $2\pi \cdot \Delta t$ is a constant which leaves the quantity $f_m \cdot b$ proportional to the required angle COS $(2\# \cdot f_m \cdot b \cdot \Delta t)$. It should be understood that the required angle may be determined by the accumulation of values for $f_m$ above for each successive beam output signal by using a Random Access Memory.

The accumulation is done in angle accumulator or adder 204. Each successive value of $f_m$ is added to the sum of the prior values stored in RAM 206. The proper correlation between $f_m$ and is corresponding accumulation is governed by beam address bus input 208 which addresses RAM 206.

In the system of the present application, thirty-six beam output signals are formed. Hence, adder 204 and RAM 206 keep a running value of the accumulated angle, $\gamma$, for each beam output signal. The value of the accumulated angle is given as:

$\gamma = b \cdot f_m$ which is outputted on bus 210 into a cosine ROM 212. For each value of the accumulated angle there is a corresponding predetermined value of the function COS $(2\pi \cdot f_m \cdot \Delta t)$ stored in the memory of cosine ROM 212. For the value of the accumulated angle addressing COS ROM 212 on bus 210 the corresponding cosine function is outputted on bus 214.

The function outputted on bus 214, COS $(2\pi \cdot f_m \cdot b \cdot \Delta t)$ may be expressed, for the purposes of simplification, as COS $(f_m) =$ COS $(B \pm f_{os})$.

The beam output signal information enters the O.D.N. along bus 216. The beam output signal information has a doppler of COS $(f_{td})$ where $f_{td}$ is the total doppler affect. It should be understood that $f_{td} = f_{os} + f_{tg}$ where $f_{tg}$ corresponds to the target doppler. The beam output signal information is added in adder 218 with offset A inputted on bus 220. It should be recalled that offset A corresponds to a frequency value equivalent to the transmitted frequency less the nearest lower multiple of the sampling frequency to the transmitted frequency. The output of adder 218 corresponds to COS $(f_{td} + A) =$ COS $(A + (f_{tg} + f_{os}))$ which is outputted on bus 222. It should be understood that this is not an exact representation of the beam output signal information but an approximation thereof which is used herein to simplify the explanation of the operation of the O.D.N.

The O.D.N. has at this point calculated the own ship doppler effect and introduced the offsets. The next step in the processing of the information is to multiply the information on buses 214 and 222 in multiplier 224.

The output of multiplier 224 on bus 226 given as:

COS $(A + f_{tg} + f_{os}) \cdot$ COS $(B + f_{os})$ (For simplicity only positive signs are used.)

$= \frac{1}{2} \text{COS}(A + B + f_{tg} + 2f_{os}) +$
$\qquad \frac{1}{2} \text{COS}((A - B) + (f_{tg} + f_{os}) - f_{os})$ -continued
$$= \tfrac{1}{2} \cos(A + B + f_{tg} + 2f_{os}) + \tfrac{1}{2} \cos((A - B) + f_{tg}).$$

The first term is the sum term which lies in sum frequency band while the second term is the target information which lies in the difference frequency band. The $A-B$ within the parenthesis of the second term is the offset of the center frequency of the difference frequency band (see FIG. 8B).

Bus 226 is connected to a band pass filter (not shown) which filters out the information corresponding to the target doppler, in this situation COS ($f_{tg}$). This half beam output signal representation of the target doppler information leaves O.D.N. 48 to enter correlator 50 (FIG. 1). It should be understood that all timing and control of the hardware in FIG. 9 may be controlled by timing and control circuitry 44 of FIG. 1.

Referring once again to FIG. 1, the signal processor 50 is shown having a correlator 51 and a spectrum leveler 53.

The principle behind the correlator is that the best correlation between the target information and set values in the correlator will result in the detection of the target speed away from or toward the ship.

For the purposes of the receiver of the present application 16 correlates are used. Each correlator will cover a range of 25 Hz. Recalling the conversion factor of 5 Hz/knt permits for speed information on the target to be given within 5 knts.

The output of the correlators goes through spectrum leveler 53 which aids in reducing the noise level further. The timing and control of the signal processor 50 is regulated by timing and control circuitry 44.

The fine bearing computer 54, by using information from correlator 51 and automatic gain control 46, can compute how far to the left or right of the stave element for which the beam output signal is centered the target is positioned. The staves elements are 10° apart but the fine bearing computer can increase the bearing accuracy to about 1 to 1½°.

The output section 30 consists of an output processor 52. From the signal processor target speed is fed into processor 52. The stave about which the beam output signal is centered and fine bearing is fed through fine bearing computer 54 into processor 52. The V.O.S.I.W. and ships course are also fed into the processor 52. Processor 52 outputs in digital format information to the display corresponding to:

1. Target range,
2. Target bearing with respect to true north,
3. Doppler (target speed),
4. Fine bearing, and
5. Ships heading.

In summary a complete sonar receiver has been described which subsequent digital beamforming analyses the received sonar signals digitally.

What I claim is:

1. A method of extracting own ship's doppler information from a digital beam output signal of a beamformer to obtain target doppler information, the method comprising the steps of:
  (A) introducing an offset frequency "A" to the digital beam output signal which is a function of the beamformer sampling frequency;
  (B) generating a digital signal representative of the own ship's doppler information and offsetting the digital signal by frequency amount "B" which is a function of the beamformer sampling frequency and offset frequency "A";
  (C) multiplying the generated digital signal with the beam output signal to obtain a signal having a difference frequency component and a sum frequency component which both lie in their respective difference frequency band and sum frequency band whereby the difference frequency band has a center frequency offset by amount $A-B$ which eliminates the effect of noise due to fold over from the negative frequency band into the difference frequency band; and
  (D) filtering out the sum frequency component to leave the difference frequency component representative of said target doppler information.

2. A method according to claim 1, wherein the offset frequency "A" is given by:

$$A = f_t - M_{fs}$$

wherein $f_t$ is the transmitted frequency, and $M_{fs}$ is the nearest lower multiple of the beamformer sampling frequency to the transmitted frequency.

3. A method according to claim 2, wherein offset "B" is chosen so that $$B = f_s/2 - A$$

where $f_s$ is the beamformer sampling frequency.

4. An apparatus for extracting own ship's doppler information from a digital beam output signal of a beamformer to obtain target doppler information, said apparatus comprising:
  (A) an adder for introducing an offset frequency "A" to the digital beam output signal where offset frequency "A" is a function of the beamformer sampling frequency;
  (B) means for generating a digital signal representative of the own ship's doppler information and means for offsetting the generated digital signal by frequency amount "B" which is a function of the beamformer sampling frequency and offset "A";
  (C) a multiplier for digitally multiplying the beam output signal with the generated digital signal to obtain a signal having a difference frequency component and a sum frequency component which both lie in their respective difference and sum frequency bands where the difference frequency band is offset in frequency by amount $A-B$ which eliminates the effect of noise due to fold over from the negative frequency band into the difference frequency band; and
  (D) a digital filter for filtering out the sum frequency component to leave the difference frequency component representative of the target doppler information.

5. The apparatus of claim 4, wherein the offset frequency "A" is the difference between transmitted frequency and the nearest lower multiple of the beamformer sampling frequency to the transmitted frequency.

6. The apparatus of claim 5 wherein the means for generating a digital signal representative of the own ship's doppler information comprise a multiplier and a read only memory.

* * * * *